April 2, 1935.   H. C. LORD ET AL   1,996,210
JOINT
Filed June 23, 1931
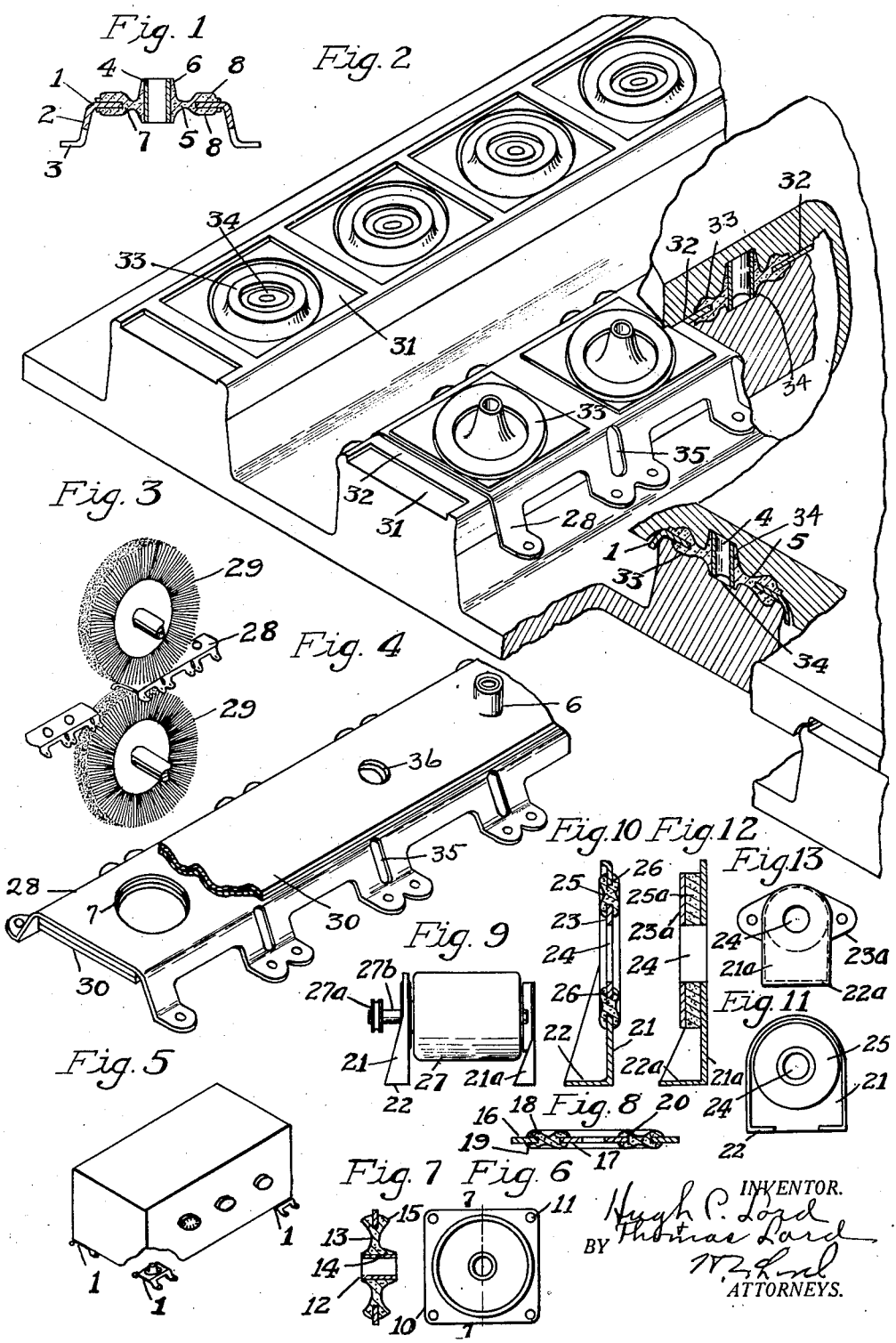

Patented Apr. 2, 1935

1,996,210

UNITED STATES PATENT OFFICE 1,996,210

JOINT

Hugh C. Lord and Thomas Lord, Erie, Pa.; said
Thomas Lord assignor to said Hugh C. Lord Application June 23, 1931, Serial No. 546,214

38 Claims. (Cl. 248—16)

Joints have heretofore been formed by providing an outer member, usually in the form of a tube, with a central member within the tube and rubber secured to the opposing surfaces of the tube and central member. Such joints are used for various purposes, as for instance, as mountings where it is desired to absorb vibration. The present invention is designed to form a joint which can be more readily and economically manufactured and to provide a method whereby this may be carried out. With the present invention one of the members at least, preferably the outer member, is formed by utilizing a flat plate. When an outer plate is used it is provided with an opening in which the joint is arranged. The rubber is secured by surface union, preferably by bonding during vulcanization, to the faces of the plate along the periphery of the opening. With this manner of forming the joint, a plurality of joints may be formed on the same plate, thus simplifying the application of the rubber and the molding, the plates being afterwards severed to separate the individual joints. In carrying out the invention also central members may be provided of cylindrical form and of some axial length, or they may be formed of a flat plate and the rubber secured to this central member forming the flat plate by bonding it to the faces of the plate adjacent to the periphery.
Features and details of the invention will appear from the specification and claims.

A preferred embodiment of the invention is illustrated in the accompanying drawing as follows:

Fig. 1 shows a central section through a finished joint having supporting feet at its sides and utilizing a tube for its central member.

Fig. 2 shows a perspective view of a mold indicating the joints in process of manufacture, the mold being partly in section and shown with one part of the mold removed.

Fig. 3 shows a perspective view of a manner of processing the plates forming the joint.

Fig. 4 a perspective view of one of the plates showing the manner of laying up the rubber thereon prior to molding.

Fig. 5 a perspective view showing the use of the joint.

Fig. 6 a plan view of a modified joint.
Fig. 7 a section on the line 7—7 in Fig. 6.

Fig. 8 a sectional view of a further modification.

Fig. 9 a side elevation of a motor showing applications of joints thereto.

Fig. 10 an enlarged section of one end of the motor support.

Fig. 11 an end view of such motor support.

Fig. 12 a section of a modified motor support.

Fig. 13 an end view of the support shown in Fig. 12.

The joint, as shown in Fig. 1, has a plate 1 with side flanges 2 terminating in feet 3. It is provided with a central member 4 and a rubber member 5, the rubber member extending at 6 along and preferably bonded during vulcanization to the central member 4 which is in the form of a tube and extending over and preferably bonded during vulcanization to the edges of an opening 7 in the plate 1 forming rings 8 of rubber on opposite faces of the plate adjacent to the periphery of the opening. The rubber between the plate and the central member may be made of the thickness desired, but is ordinarily somewhat thinner than the portions 8 so that the movement of the joint is in this portion of the rubber bridging the space and where used as a mounting as it ordinarily is the rubber sustains the load through the shear of the rubber and thus facilitates the absorption of vibration through the action of the rubber.

In Fig. 5 a joint of this character is shown as carrying a radio instrument 1a and indicates the ordinary manner of use.

In Figs. 6 and 7 a modification of such a joint is shown. Here the outer member, or plate 10 is flat having perforations 11 at its corners by which it may be readily secured. A central tube 12 is connected by a rubber member 13 with the outer plate, the rubber extending at 14 along and preferably bonded to the tube 12 and extending over and preferably bonded to the faces of the plate 10 adjacent to the periphery of the opening. Shoulders or rings 15 of the rubber along the surfaces of the plate are thickened and have a relation to the length of the tube 12 so as to form a limiting stop. This relation is so adjusted that when the weight is attached and the natural sag of the rubber under the weight has taken place a free vibration range is established without resistance by the shoulder 15, but any out of the normal shock carries the load on to the shoulders 15 and the movement is thus arrested. The flat plate forms a proper backing for taking this shock.

In Fig. 8 a modified joint is shown in which there is an outer plate 16 having a joint opening arranged therein. A central member 17 is in the form of a plate, the outer periphery of the plate 17 being within the periphery of the opening in the plate 16. A rubber member 18 bridges the space between the plates 17 and 16 and has an extension 19 on the outer periphery bonded to the faces of the plate 16 adjacent to the opening. The rubber likewise has extensions 20 on its inner periphery which extend over and are preferably bonded to the faces of the plate 17. The plate 16 is shown as a flat plate being similar in contour to the plate 12 shown in Fig. 6. It will be understood that the plate 16, or the plate 12 with the form of rubber mounting may have the flanges 2 and feet 3, as indicated in Fig. 1, if this is desired.

In both the structures of Figs. 6 and 8, as well as the structure shown in Fig. 1, they are ordinarily used with the rubber in shear, at least in shear with relation to the vibration thrusts upon it.

In Fig. 9 a mounting, or joint similar to that shown in Fig. 8 is utilized for supporting an electric motor in which the torque impulses of the motor induce the principal vibrations. In this structure plates 21 are arranged at the ends of the motor. These plates are provided with feet 22 for attachment to a base. The plates are provided with joint openings and a central member 23 is arranged within the opening. The central member has an opening 24 through which a portion of the motor case, or frame extends. A rubber member 25 is arranged between the inner and outer members, the rubber having extensions 26 secured preferably by bonding during vulcanization to these surfaces. The motor is provided with the usual case 27 and power is taken from the motor through a pulley 27a on a motor shaft 27b. The torque impulses and vibrations induced thereby are absorbed by the rubber in shear. The belt pull and the gravity thrusts are sustained by the direct stress on the rubber. Where there is a very definite unbalanced condition of the motor it may be better to place the rubber in shear not only as to the torque vibrations, but as to the radial thrusts. This may be done as shown in Figs. 12 and 13 where a supporting plate 21a has an opening through which the motor shaft extends, this plate having feet 22a. A second annular plate 23a has an opening 24 through it. Rubber 25a is arranged between the plates 23a and 21a and bonded to the opposing surfaces so that the rubber is arranged around the axis preferably in a continuous annulus and absorbs the torque thrusts through the shear of the rubber and also the radial thrusts. Where there is a nicely balanced condition the support of the structure by the direct stress of the rubber is preferable, the rubber in shear taking the torque vibrations.

In all of these joints it is preferable to secure the rubber to the joint members by bonding during vulcanization so that the rubber of the joint member is put under initial tension through the shrinkage of the rubber.

The structure is of particular advantage by reason of its cheapness, by the fact that the surface for the bonding may be extended as much as may be desirable and it lends itself readily to expansion into large sizes. The wall of rubber, 8 Fig. 1, 15 Fig. 7, and 18 Fig. 8, which projects at right angles to the overlapped and bonded surface of the plate is in direct (tension or compression) thrust relation with the overlapped portion and in shear relation with the rubber projecting from the overlapped plate as 5 in Fig. 1, and 13 in Fig. 7, and the rubber extending radially between the plates in Fig. 8. The surrounding wall as 8, 15, or 18, is subjected when the central member is under load to a compression stress above the plate and a direct tension stress below the plate. In as much as the compression resistance and the tension resistance of the rubber are very much more than the resistance of the rubber in shear, the yielding axially of this wall is very little compared to the shear movement of the projecting rubber and this remains true as the depth of the wall in a direction perpendicular to the face of the plate is increased. So that this wall supports the projecting rubber in much the same manner as a perpendicularly extended metallic wall supporting the rubber in shear. To accomplish this purpose, the surface for the bonding may be extended, as just above stated, as much as desirable and the radial thickness of the wall may, therefore, be made as thick as desirable to give the proper support for the more active rubber in shear and this same utilization of the supporting rubber wall extending perpendicularly from the face of the plate may be utilized with relation to the central member, as indicated in Fig. 8, and the same general functional action takes place and such wall forms a definite support for the more active rubber in shear. In either case, the rubber projects from the plate so as to place the rubber in shear and in either case the rubber in shear is supported by the wall formed by the rubber subjected to direct thrust with relation to the plate.

While we have shown the inner and outer members, except in the structure illustrated in Fig. 12, in alinement radially, it will be understood that while this is preferable the central member may be simply within the projected area of the opening.

In fabricating these joints the plate forming the outer member of the joint is usually fabricated in lengths carrying a plurality of openings. This permits of processing the metal for a plurality of joints in a single operation.

In Fig. 3 buffing wheels 29 are shown operating simultaneously on the top and bottom of a plate, such as is used in the joint shown in Fig. 1. After the plate is properly processed for bonding the rubber 30 having a proper bonding face is laid on the top and bottom surfaces of the plate bridging the opening 7 in the plate. Perforations 36 are formed in these strips of rubber and the tube properly processed for bonding, as the tube 6, inserted in the center of the opening. This plate with the tubes and rubber in this form is placed in the mold, the mold having the cavities 31 receiving the rubber with cut-off, or gate surfaces 32 in the locations at which the plate is to be severed to form the individual joints. The mold has an annular portion 33 shaping it for the rubber to give the rubber the desired strength and has a central socket 34 bottoming and locating the central tube. The plate is placed in this mold with the rubber placed as in Fig. 4 and a similar upper mold operates on a plurality of joints on the plate. Ordinarily there are not only a plurality of joints on each plate, but surfaces to receive a plurality of plates, as shown in Fig. 2. The plates are preferably provided with perforations 35 in the side flanges so that after the molding operation the main plate and feet may be severed by a direct shearing operation. In this way these joints may be fabricated with very much greater rapidity than it is possible using cylindrical parts, particularly the cylindrical part for the outer member.

In molding the flat center structure, such as shown in Fig. 8, the same system is used except that the central plate is centered through the mold by any registering device in the manner similar to the centering of the central tube.

In Fig. 9 we have shown at the left the motor support as illustrated in Figs. 10 and 11 and on the right of the motor shown in Fig. 9 the motor support shown in Figs. 12 and 13, but it will be understood that ordinarily the motor supports at both ends of the motor will be the same.

While we have shown herein the application of mountings to rotating devices having torque vibrations in which the radial as well as the torque vibrations are received in shear we do not in this application claim specifically this species of our invention.

While we have shown and described herein a joint having supports and also a mounting strip adapted to form a plurality of joints and a method of forming joints we do not claim these features in this application as they are embodied in a divisional application.

What is claimed as new is:

1. In a joint, the combination of a supporting member, a supported member, one of which is a plate, and a resilient rubber joint element bonded by a surface union to one of the members and disposed in thrust resisting relation to the other of said members, said element including a body of rubber so disposed as to receive the thrust of the joint in shear stress, said body overlapping both faces of the plate and projecting from one of the members crosswise of the direction of shear, the overlapping portion of the body forming a wall disposed in direct thrust relation to the overlapped member and in shear relation with the projecting rubber.

2. In a joint, the combination of a supporting member, a supported member, and a resilient rubber joint element bonded by a surface union to one of the members and disposed in thrust resisting relation to the other of said members, said element including a body of rubber so disposed as to receive the thrust of the joint in shear stress, said body overlapping and projecting from the member to which it is bonded, crosswise of the direction of shear, the overlapping portion of the body forming a wall disposed in direct thrust relation to the overlapped member and in shear relation with the projecting rubber.

3. In a joint, the combination of a supporting member; a supported member; and a resilient rubber joint element bonded by a surface union to both of said members, said element including a body of rubber so disposed as to receive the thrust of the joint in shear stress, said body overlapping and projecting from both of said members crosswise of the direction of shear, the overlapping portion of the body on each member forming a wall disposed in direct thrust relation with the overlapped member and in shear relation with the projecting rubber.

4. In a joint, the combination of a supporting member; a supported member, one of which is a plate, one of said members having an opening and the other of said members being arranged within the projected area of the opening, and a resilient joint element bonded by a surface union to one of the members and disposed in thrust-resisting relation to the other of said members, said element including a body of rubber so disposed as to receive the thrust of the joint in shear stress, said body overlapping both faces of the plate and projecting from the member to which it is bonded crosswise of the direction of shear.

5. In a joint, the combination of a supporting member; a supported member, one of said members having an opening and the other of said members being arranged within the projected area of the opening; and a resilient joint element bonded by a surface union to one of the members and disposed in thrust resisting relation to the other of said members, said element including a body of rubber so disposed as to receive the thrust of the joint in shear stress, said body overlapping and projecting from the member to which it is bonded crosswise of the direction of shear, the overlapping portion of the body forming a wall disposed in direct thrust relation to the overlapped member and in shear relation with the projecting rubber.

6. In a joint, the combination of a supporting member; a supported member, one of which is a plate, one of said members having an annular opening and the other of said members being within the projected area of said opening; and a rubber joint element bonded by a surface union to the outside member and in thrust resisting relation to the central member, said element including a body of rubber so disposed as to receive the thrust of the joint in shear stress, said body overlapping both faces and projecting from the plate crosswise of the direction of shear, the overlapping portion of the body forming a wall disposed in direct thrust relation to the overlapped member and in shear relation with the projecting rubber.

7. In a joint, the combination of a supporting member; a supported member, the outer of said members having an opening and the inner of said members being within the projected area of the opening; and a resilient rubber joint element bonded by a surface union to the inner member and disposed in thrust resisting relation to the outer member, said element including a body of rubber so disposed as to receive the thrust of the joint in shear stress, said body overlapping and projecting from the inner member crosswise of the direction of shear, the overlapping portion of the body forming a wall disposed in direct thrust relation to the overlapped member and in shear relation with the projecting rubber.

8. In a joint, the combination of a supporting member, a supported member, and a resilient rubber joint element bonded by a surface union to one of the members and disposed in thrust resisting relation to the other of said members, said element including a body of rubber so disposed as to receive the thrust of the joint in shear stress, said body overlapping and projecting from one of the members crosswise of the direction of shear, the overlapping portion of the body forming a wall disposed in direct thrust relation to the overlapped member and in shear relation with the projecting rubber, the members having free relative movement through shear of the element under normal thrust, said wall having a bottoming surface adapted to receive the load under abnormal thrust.

9. In a joint, the combination of a supporting member; a supported member, one of said members having an opening and the other of said members being arranged within the projected area of the opening, and a resilient joint element bonded by a surface union to one of the members and disposed in thrust resisting relation to the other of said members, said element including a body of rubber so disposed as to receive the thrust of the joint in shear stress, said body overlapping and projecting from one of the members crosswise of the direction of shear, the overlapping portion of the body forming a wall disposed in direct thrust relation to the overlapped member and in shear relation with the projecting rubber, said members having free relative movement through shear of the element under normal thrust, said wall having a bottoming surface adapted to receive the load under abnormal thrust.

10. In a joint, the combination of a supporting member; a supported member, one of said members having an opening and the other of said members being arranged within the projected area of the opening; and a resilient joint element bonded by a surface union to one of the members and disposed in thrust resisting relation to the other of said members, said element including a body of rubber so disposed as to receive the thrust of the joint in shear stress, said body overlapping and projecting from the member to which it is bonded crosswise of the direction of shear, the overlapping portion of the body forming a wall disposed in direct thrust relation to the overlapped member and in shear relation with the projecting rubber, said members having free relative movement through shear of the element under normal thrust, said wall having a bottoming surface adapted to receive the load under abnormal thrust.

11. In a joint, the combination of a supporting member; a supported member, one of which is a plate, one of said members having an opening and the other of said members being arranged within the projected area of the opening, one of said members having an axially disposed surface; and a resilient joint element bonded by a surface union to the axially disposed surface and disposed in thrust resisting relation to the other of said members, said element including a body of rubber so disposed as to receive the thrust of the joint in shear stress, said body projecting from the axially disposed surface of the member to which it is bonded and overlapping both faces and projecting from the plate crosswise of the axis of the member, the overlapping portion of the body forming a wall disposed in direct thrust relation to the overlapped member and in shear relation with the projecting rubber.

12. A cushion mounting unit comprising two attaching members, one of which is a sheet plate, and a rubber element overlapping the face of the plate and permanently secured to both of said members and to one of them at least by a surface union, said rubber element projecting edgewise of the plate into free space between the members.

13. A cushion mounting comprising two members, one of which is a sheet plate, and a rubber element overlapping the face of the plate and secured to said members and to the sheet plate by bonding to the overlapped face, said rubber element projecting edgewise of the plate into free space between the members.

14. A cushion mounting comprising two members, one of which is a sheet plate, and a rubber element overlapping the face of the plate and secured to said members by bonding, the bonding of the sheet metal member being on the overlapped face, said rubber element projecting edgewise of the plate into free space between the members.

15. A cushion mounting unit comprising two attaching members, one of which is cylindrical and the other a sheet plate, and a rubber element overlapping the face of the plate and permanently secured to both of said members and to one of them at least by bonding, said rubber projecting into free space between the members.

16. A cushion mounting comprising two members, the outer member of which is in the form of a sheet plate having an opening and the inner member cylindrical, and a rubber element overlapping the face of the plate and secured to said members and one of them at least by bonding, said rubber projecting into free space between the members.

17. A cushion mounting comprising two members of sheet plate, the outer member having an opening and the inner member being arranged within the projected area of the opening, and a rubber element overlapping the faces of said plates and secured to said members and to one at least by a surface union of the overlapped portion, said rubber projecting into free space between the members.

18. A cushion mounting comprising two members of sheet plate, the outer member having an opening and the inner member being arranged within the projected area of the opening, and a rubber element overlapping the faces of said plates, said rubber element being secured to said members by bonding of the rubber to the overlapped surfaces, said rubber projecting into free space between the members.

19. A cushion mounting comprising a member in the form of a sheet plate; a rubber member overlapping both faces of the sheet plate and bonded thereto by a surface union with said faces, said rubber projecting edgewise from said plate into free space; and a second member connected to the rubber member.

20. A cushion mounting comprising a surrounding plate with an opening therethrough; and a rubber member bonded by a surface union with both faces of the plate adjacent to the opening and extending into the opening.

21. A cushion mounting unit comprising two attaching members, one of which is a sheet plate, and a rubber element overlapping the face of the plate and permanently secured to both of said members and to one of them at least by a surface union, said rubber element projecting into free space between the members, the rubber element having a bottoming surface adapted to limit the movement of the element.

22. A cushion mounting comprising two members, one of which is a sheet plate, and a rubber element overlapping the face of the plate and secured to said members and to one of them at least by a surface union, said rubber element projecting into free space between the members, the rubber element having a bottoming surface on the overlapped portion adapted to limit the movement of the element.

23. A cushion joint having a surrounding plate with an opening therethrough, and a rubber member bonded by a surface union with the plate adjacent to the opening and extending into the opening, said rubber member having a bottoming surface on the overlapping portion of the rubber adapted to limit the movement of the element.

24. In a joint, the combination of two members, one of which is in the form of a sheet plate; a rubber member between said joint members and secured to the sheet plate by an extension of rubber over the face of the plate, the rubber being bonded by a surface union with the face of the plate; and a device supported by one of the joint members, the rubber being so disposed between the members with relation to the device as to receive thrusts from the device in shear with relation to said members.

25. In a joint, the combination of a surrounding plate with an opening therethrough; a central member within the projected area of the opening; a rubber member secured to the central member and overlapping the surrounding plate and secured thereto through bonding by a surface union to the overlapped face; and a device supported by one of the joint members, the rubber being so disposed between the members with relation to the device as to receive thrusts from the device in shear with relation to said members.

26. A mounting having a thickened peripheral portion of rubber provided with a radially extending load carrying base, and a load carrying rubber portion projecting inwardly from the peripheral portion, said load carrying portion being thin axially as compared with the peripheral portion and adapted to support its load in shear relatively to said peripheral portion, and a member having a comparatively non-deformable load-receiving portion permanently united with the rubber portion.

27. A cushion mounting comprising two members the outer member of which is in the form of a sheet plate comprising an opening and the inner member cylindrical and a rubber element overlapping both faces of the plate adjacent the periphery of the opening and secured to both members by bonding, said rubber projecting into free space between the members.

28. The combination with a device having rotating parts inducing torque reactions as an incident to its operation of a joint having two annular members through which the axis of torque reactions extends, one of said members forming a support and the other of said members being attached to the rotating device; and a rubber member connecting said members and bonded by a surface union to one of said members, said rubber member receiving the torque reactions through shear of the rubber.

29. The combination with a device having rotating parts inducing torque reactions as an incident to its operation of a joint having an arcuate member in the form of a plate extending about the axis of torque reactions; an inner member, one of said members acting as the support and the other being connected with the device; and a rubber element connecting the inner member and the outer member, said rubber element overlapping and being bonded by a surface union to the face of the plate and projecting radially edgewise therefrom, said rubber member receiving torque thrusts in shear on the rubber.

30. The combination with a device having rotating parts inducing torque reactions as an incident to its operation of a joint having an arcuate outer member extending about the axis of torque reactions; an inner member in the form of a plate, one of said members acting as the support and the other being connected with the device; and a rubber element connecting the inner member and the outer member, said rubber element overlapping and being bonded by a surface union to the face of the plate and projecting radially edgewise of the plate, said rubber member receiving torque thrusts in shear on the rubber.

31. The combination with a device having rotating parts inducing torque reactions as an incident to its operation of a joint having an arcuate outer member extending about the axis of torque reactions; an inner member, both of said members being in the form of a plate, one of said members acting as the support and the other being connected with the device; and a rubber element connecting the inner member and the outer member, said rubber element overlapping and being bonded by a surface union to the face of a plate and projecting radially edgewise of the plate, said rubber member receiving torque thrusts in shear on the rubber.

32. The combination with a device having rotating parts inducing torque reactions as an incident to its operation of a joint having an arcuate member in the form of a plate extending about the axis of torque reactions; an inner member, one of said members acting as the support and the other being connected with the device; and a rubber element connecting the inner member and the outer member, said rubber element overlapping and being bonded by a surface union to both faces of the plate and projecting radially edgewise therefrom, said rubber member receiving torque thrusts in shear on the rubber.

33. The combination with a device having rotating parts inducing torque reactions as an incident to its operation of a joint having an arcuate outer member extending about the axis of torque reactions; an inner member, both of said members being in the form of a plate, one of said members acting as the support and the other being connected with the device; and a rubber element connecting the inner member and the outer member, said rubber element overlapping and being bonded by a surface union to both faces of a plate and projecting radially edgewise of the plate, said rubber member receiving torque thrusts in shear on the rubber.

34. The combination with a device having rotating parts inducing torque reactions as an incident to its operation of a joint having an arcuate member extending about the axis of torque reactions; an inner member, one of said members acting as the support and the other being connected with the device and one of said members being in the form of a sheet plate; and a rubber element connecting the inner member and the outer member, said rubber element being bonded by a surface union to both of said members and overlapping a face of the plate and projecting radially edgewise therefrom, said rubber member receiving torque thrusts in shear on the rubber.

35. The combination with a deivce having rotating parts inducing torque reactions as an incident to its operation of a joint having an arcuate member extending about the axis of torque reactions; an inner member, one of said members acting as the support and the other being connected with the device and one of said members being in the form of a sheet plate; and a rubber element connecting the inner member and the outer member, said rubber element being bonded by a surface union to both of said members and overlapping both faces of the plate and projecting radially edgewise therefrom, said rubber member receiving torque thrusts in shear on the rubber.

36. The combination with a device having rotating parts inducing torque reactions as an incident to its operation; of a joint having an outer member in the form of a plate with an opening therethrough surrounded by the plate through which the axis of the rotating device extends; an inner member, one of said members acting as the support and the other being connected with the device; and a rubber element connecting the inner member and the outer member, said rubber element being bonded to one of the members by a surface union, said rubber member being so disposed as to receive torque reactions through shear of the rubber, and radial thrust through direct stress on the rubber.

37. The combination with a device having rotating parts inducing torque reactions as an incident to its operation of a joint having an outer member in the form of a plate with an opening therethrough surrounded by the plate and through which the axis of torque reactions extends; an inner member, one of said members forming the support and the other of said members being secured to the device; and a rubber member connecting the inner member and the outer member, said rubber member being bonded to both faces of the plate and projecting radially edgewise therefrom and disposed to receive torque reactions through shear of the rubber.

38. The combination with a device having rotating parts inducing torque reactions as an incident to its operation of a joint for each end of the device having an arcuate outer member extending about the axis of torque reactions and an inner member, one of said members acting as the support and the other being connected with the device and one of the members of each joint being in the form of a sheet plate; and a rubber element connecting the members of each joint, said rubber element of each joint being bonded to a face of the plate of said joint and in one joint at least projecting radially edgewise from the plate, said rubber member of each joint receiving torque thrusts of the device in shear on the rubber.

HUGH C. LORD.
THOMAS LORD.